United States Patent Office 3,068,287
Patented Dec. 11, 1962

3,068,287
PROCESS FOR PRODUCING 1,8-DIOXIMINO-4,7-METHANO-3a,4,7,7a-TETRAHYDROINDENE
Harry A. Stansbury, Jr., South Charleston, and David T. Manning, Charleston, W. Va., assignors to Union Carbide Corporation, a corporation of New York
No Drawing. Filed Dec. 30, 1958, Ser. No. 783,701
4 Claims. (Cl. 260—566)

This invention relates to an improved process for producing 1,8-dioximino-4,7-methano-3a,4,7,7a - tetrahydroindene in high yields from relatively inexpensive reagents. While processes for preparing 1,8-dioximino-4,7-methano-3a4,7,7a-tetrahydroindene, hereinafter referred to as oximinocyclopentadiene dimer or simply the dioxime are known, no completely satisfactory method has yet been discovered for the production of this valuable material.

It has now been found that 1,8-dioximino-4,7-methano-3a,4,7,7a-tetrahydroindene (the dioxime) can be produced more economically and in higher yields and purity then possible by the prior art methods. The dioxime is produced by the process of this invention by reacting cyclopentadiene with nitrosyl chloride and an alcoholic solution of an alkali metal hydroxide to form the alkali metal salt of a nitrosated cyclopentadiene which is subsequently neutralized with an acid to release the dioxime. The alcohol is removed from the reaction mass by distillation and the dioxime is recovered from the reaction mass by extraction with an inert solvent which has a boiling point higher than the boiling point of the alcohol. A part of all of the inert solvent is added prior to distilling off the alcohol.

In a preferred method of this invention cyclopentadiene is gradually added to a solution of nitrosyl chloride and sodium hydroxide in methanol and reacted at a temperature of about 0° C. to about 20° C. An extraction solvent, such as p-dioxane, is then added to the reaction mixture. The reaction mixture is then neutralized with carbon dioxide at a temperature of about 0° C. to about 15° C. The methanol is distilled, the residue is filtered, and a solution of the dioxime in the p-dioxane extraction solvent is recovered. The yield of dioxime produced by this preferred method, based on the weight of the cyclopentadiene reactant, can be as high as about 95% to 98%. The reactions of the above process can be represented as follows:

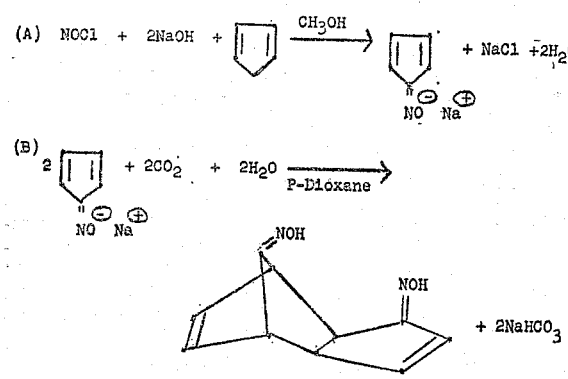

In practice, it is not necessary to add water to complete step (B) since the water formed in step (A) is sufficient. Although the above mechanism described the starting materials and final product, it has not been definitely determined that dimerization occurs after neutralization of the sodium salt of oximinocyclopentadiene with carbon dioxide as portrayed. It is possible that dimerization occurs prior to neutralization with carbon dioxide. Regardless, applicants do not intend this theoretical discussion to limit their invention.

Various modifications of the above preferred method in the order of adding the reagents can also be employed. Thus, cyclopentadiene may be added first to the methanolic sodium hydroxide solution followed by the addition of the nitrosyl chloride. Also cyclopentadiene can first be added to the methanolic sodium hydroxide solution and the resulting solution is then fed to a reaction mixture prepared from nitrosyl chloride, sodium hydroxide and methanol. Any of the alkali metal hydroxides, such as those of sodium, potassium or lithium are suitable. The preferred alkali metal hydroxide is sodium hydroxide.

The molar quantities of the reactants are not critical as long as the moles of base are in excess of the moles of nitrosyl chloride. This is necessary to keep the reaction mixture basic, which allows the nitrosation reaction to proceed while preventing acid-catalyzed polymerization of the cyclopentadiene. It is preferred that the molar ratio of the reactants is that shown in the preferred process, namely a molar ratio of 2.62: 1.09:1, respectively, for the alkali metal hydroxide, nitrosyl chloride and cyclopentadiene. However, satisfactory results are obtained by employing such quantities wherein the molar ratio of nitrosyl chloride to cyclopentadiene varies from about 4:1 to 0.5:1, respectively.

The reaction temperature in forming an alkali metal salt of cyclopentadiene can ordinarily range from about —10° C. to about 25° C. The preferred temperature range is from about 5° C. to about 15° C. It is desirable that this reaction temperature not be allowed to rise above 25° C. since undesirable by-products are formed. The temperature employed in forming the nitrosating mixture of the alcoholic solution of the alkali metal hydroxide with the nitrosyl chloride is not critical and temperatures from about —10° C. to about 25° C. to 35° C. can be used. The reaction time is not critical and can vary over wide limits. It is preferable to react for a period of from about one to three hours although periods ranging from 0.5 to 10.0 hours can be used. Pressure is not critical although the reaction is preferably conducted under atmospheric pressure. The alcohol diluent used to dissolve the hydroxide is removed from the reaction mixture by distillation, preferably under vacuum such as about 500 mm. to about 10 mm. of mercury pressure at temperatures between about 50° C. to about 100° C. Contact of the reaction mixture with the extraction solvent for at least about 30 minutes at 60 to 80° C. is desirable in order to insure complete extraction of the product.

The alcohol solvents contemplated for dissolving the alkali metal hydroxides are the monohydric alkyl alcohols and particularly those of the lower alkyls having from one to about six carbon atoms. The preferred alcohol is methanol. Other alcohols, for the purpose of illustration include ethanol, propanol, and the like. Adequate amounts of alcohol should be employed since if the quantity of alcohol employed is insufficient to dissolve all of the hydroxide a part of the cyclopentadiene may resinify thus giving decreased yields. The minimum amount of alcohol solvent employed depends upon the solubility of the alkali metal hydroxide in the alcohol selected. Thus, approximately ten moles of methanol per mole of sodium hydroxide produces a satisfactory solution although somewhat smaller quantities of methanol can also be used such as 5 moles. Higher molar ratios of methanol (20:1) are permissible but lower productivity results by increasing the reaction volume.

The inert extraction solvent employed should meet a number of requirements since it must be capable of dissolving the dioxime in reasonable concentration without dissolving significant amounts of the inorganic salts and tarry by-products present in the reaction mixture. It must be sufficiently high boiling to enable the ready separation of the alcohol solvent in a simple flash distillation without undue loss of extraction solvent, and it must be unreactive with the dioxime at the extraction temperatures. Also it is preferable to select an extraction solvent which is inert to hydrogenation reactions and reactants formed from subsequently hydrogenating the dioxime if such hydrogenations are desired. Suitable extraction solvents are mono- and poly-ethers having boiling points from about 80° C. to about 250° C. and preferably those with boiling points from about 100° C. to about 200° C. Illustrative of such ether solvents are: p-dioxane; diethyl Carbitol (diethyl-ether of diethylene glycol manufactured by Union Carbide Corp.); dimethyl Carbitol (dimethyl-ether of diethylene glycol manufactured by Union Carbide Corp.); diethyl Cellosolve (diethyl-ether of ethylene glycol) and mixtures of these solvents. Other classes of solvents are: organic amides such as dimethyl formamide and diethyl formamide, and organic bases such as pyridine, N-methyl morpholine and the like. The preferred solvent is p-dioxane. The extraction can be carried out at temperatures of from about 50° C. to about 100° C. and preferably from about 70° C. to about 90° C. The quantity of the extraction solvent can vary from about 3 parts by weight to about 30 parts by weight and preferably from 5 to 15 parts by weight of the theoretical dioxime expected. The extraction solvent can be added either prior to or after the neutralization of the alkali metal salt of the nitrosated cyclopentadiene.

The acidic neutralization agent can be any acidic material such as organic acids, inorganic acids or their acidic salts. Illustrative of the neutralizing agents that can be used in this invention there may be mentioned hydrochloric acid, sulfuric acid, phosphoric acid, carbonic acid, sulfurous acid, oxalic acid, formic acid, acetic acid, and the like. Carbon dioxide is the preferred neutralizing agent. The reaction mixture is neutralized to a pH of about 5–8 and preferably 6.5–7.5 to produce the free acid form of the dioxime from its alkali metal salt. The temperature at which neutralization is conducted is not critical although it is preferred that it be conducted at the temperatures employed for the previous reactions.

The dioxime produced by the process of this invention has utility as a curing agent for epoxy resins.

The following examples are illustrative of the invention.

Example 1

To a solution of 150 grams of sodium hydroxide (3.75 moles) in 1500 ml. of methanol in a glass reaction vessel there was added, with stirring, 102.5 grams (72 ml. at −30° C., 1.56 moles) of nitrosyl chloride over a 15-minute period while maintaining the temperature at −3° C. to −5° C. with a Dry Ice-acetone cooling bath. With continued vigorous stirring, 94.5 grams (1.43 moles) of cyclopentadiene were then added over a 25-minute period. During the addition, the temperature rose gradually to 5 to 10° C., where it was held for an additional period of two hours. At the end of this time, 1500 ml. of p-dioxane were added and the mixture was neutralized with gaseous carbon dioxide at 5 to 15° C. The methanol was then removed by vacuum stripping at 300 mm. mercury pressure to a kettle temperature of 50° C. The reaction mixture was then stirred at 75° C. for a short period of time and filtered to remove insolubles and to recover 1,8-dioximino-4,7-methano-3a,4,7,7a-tetrahydroindene (the dioxime) as a 6.6% solution in p-dioxane. The yield of recovered dioxime was 94.6% based on the weight of cyclopentadiene employed. The dioxime was recovered by evaporation of the p-dioxane extraction solvent, and a sample thereof melted at 167–180° C. The infrared spectrum of the recovered dioxime was identical with that of a known sample of 1,8-dioximino-4,7-methano-3a,4,7,7a-tetrahydroindene.

Example 2

This example was performed in a manner similar to that described in Example 1 except that the cyclopentadiene was added in one portion instead over a 25-minute period as in Example 1. Upon addition of the cyclopentadiene a strongly exothermic reaction occurred and the temperature rose briefly to 22° C. before being being reestablished at 10° C. The yield of the dioxime which had a melting point of 166 to 168° C. was 98.3% based on the weight of the cyclopentadiene employed.

Example 3

This example was performed in a manner similar to that described in Example 1, except that potassum hydroxide was substituted for sodium hydroxide. The yield of the dioxime was 90.8% based on the weight of the cyclopentadiene reactant charged and it had a melting point of 162° C. to 165° C.

Example 4

A nitrosating reaction mixture was prepared by adding 102.5 grams (72 ml. at −30° C., 1.56 moles) of nitrosyl chloride to a solution of 75 grams of sodium hydroxide (1.875 moles) in 1000 ml. of methanol over a 29-minute period while holding the temperature at 14 to 20° C. by means of an ice bath.

To a second solution of 75 grams of sodium hydroxide in 1000 ml. of methanol there was added 94.5 grams (1.43 moles) of freshly distilled cyclopentadiene over a 10-minute period while maintaining the temperature at 3 to 7° C. by external cooling. The solution of cyclopentadiene, methanol and sodium hydroxide was then fed dropwise at 2 to 8° C. over a period of 57 minutes to the nitrosating mixture while vigorously stirring. Stirring at 3 to 5° C. was then continued for an additional 2.2 hour interval. At the end of this time the reaction mixture was diluted with 750 ml. of cold water, stripped free of methanol under reduced pressure (steam bath) and then extracted several times with diethyl ether to remove impurities, discarding the extracts. Gaseous carbon dioxide was then passed into the aqueous reaction mixture at 7 to 8° C. until neutral, and the product recovered by continuous diethyl ether extraction of the mixture which consisted of solid and liquid phases. Evaporation of ether from the dried, combined ether extracts left a total of 87.5 grams (64.4% yield) of 1,8-dioximino-4,7-methano-3a,4,7,7a-tetrahydroindene.

Example 5

To a stirred solution of 255 grams (6.38 moles) of sodium hydroxide in 1500 ml. of methanol there was added at 5° C., in one portion, 189 grams (2.86 moles) of cyclopentadiene. Then, with continued stirring and cooling, 102.5 grams (72 ml. at −30° C., 1.56 moles) of nitrosyl chloride were added at 5 to 11° C. over a 21-minute period and the stirring continued for an additional period of one hour. The reaction mixture was diluted with 2000 ml. of diethyl Carbitol and neutralized with gaseous carbon dioxide while cooling at 3 to 12° C. with an ice bath. Methanol was then stripped out under reduced pressure and the solution of the product completed by allowing the diethyl Carbitol to reflux at 72° C./10 mm. with stirring for one hour. The reaction mixture was filtered to remove salts and other solid impurities and the 1,8-dioximino-4,7-methano-3a,4,7,7a-tetrahydroindene (the dioxime) was recovered in the diethyl Carbitol solvent filtrate. The yield of the dioxime was 96.5 grams (65.1% of theoretical) based on the cyclopentadiene charged.

Example 6

The diglycidyl ether of bisphenol A (1.0 gram), oximinocyclopentadiene dimer (0.5 gram), and dimethylformamide were mixed in a glass tube and heated at 120° C. for 20 minutes after which time an additional 0.5 gram of solvent (dimethylformamide) was added to facilitate complete solution. After heating at 120° C. for an additional 40 minutes there was obtained a dark colored solution which was viscous at room temperature. A portion of the polymer solution was brushed onto a black-iron panel and the coated panel was cured for 30 minutes at 160° C. in an electrically heated oven. There was obtained a dark colored, very hard film which was uneffected by scratching with a Double Eagle pencil of 9H hardness and which was uneffected by acetone.

What is claimed is:

1. A process for producing 1,8-dioximino-4,7-methano-3a,4,7,7a-tetrahydroindene which comprises reacting at a temperature of from 10° C. to 25° C. cyclopentadiene, nitrosyl chloride, and a solution of an alkali metal hydroxide in a lower alkyl monohydric alcohol the mole ratio of said alkali metal hydroxide to said nitrosyl chloride being greater than one, and neutralizing the resulting reaction mixture to form 1,8-dioximino-4,7-methano-3a,4,7,7a-tetrahydroindene.

2. A process for producing 1,8-dioximino-4,7-methano-3a,4,7,7a-tetrahydroindene which comprises adding nitrosyl chloride to a solution of sodium hydroxide in methanol the mole ratio of said sodium hydroxide to said nitrosyl chloride being greater than one, at a temperature of from about 0° C. to about 20° C., reacting the resulting mixture with cyclopentadiene at a temperature of from about 5° C. to about 15° C., adding p-dioxane to the resulting reaction mixture, neutralizing the reaction mixture with carbon dioxide, distilling the methanol out of the reaction mixture and finally filtering the reaction mixture to obtain said indene compound as the filtrate in solution with p-dioxane.

3. A process for producing 1,8-dioximino-4,7-methano-3a,4,7,7a-tetrahydroindene which comprises reacting at a temperature of from 10° C. to 25° C. cyclopentadiene with a mixture of nitrosyl chloride and a solution of an alkali metal hydroxide in a lower monohydric alkyl alcohol the mole ratio of said alkali metal hydroxide to said nitrosyl chloride being greater than one, neutralizing the reaction mixture with an acidic substance, to form said indene compound, adding to the reaction mixture an inert organic solvent for the indene compound, said solvent having a boiling point higher than that of the monohydric alcohol, distilling the alcohol out of the reaction mixture and finally filtering out of the reaction mixture a solution of the indene compound in the said inert organic solvent.

4. The process of claim 3 wherein the inert solvent has a boiling point of from about 80° C. to about 250° C.

References Cited in the file of this patent

UNITED STATES PATENTS 2,394,430    Crowder et al. _____ Feb. 5, 1946

OTHER REFERENCES

Thiele: Berichte der Deut, Chem. Gesell., vol. 33, pages 666–670 (1900).

Alder et al.: Liebig's Annalen, vol. 496, pages 203–6 (1932).

Wieland et al.: Liebig's Annalen, vol. 360, pages 299–322 (1908).

Tilden et al.: J. Chem. Soc. (London), New Series, vol. 65, pages 324–335 (1894).

(Copies of above in Pat. Off. Sci. Library.)